US005404808A

United States Patent [19]

Smith et al.

[11] Patent Number: 5,404,808

[45] Date of Patent: Apr. 11, 1995

[54] CARRIER FOR HOT FOOD

[75] Inventors: Donald P. Smith, Dallas; Jarald E. High, Grand Prairie; John R. Norris, Plano, all of Tex.

[73] Assignee: Patentsmith II, Inc., Dallas, Tex.

[21] Appl. No.: 817,870

[22] Filed: Jan. 7, 1992

Related U.S. Application Data

[63] Continuation-in-part of Ser. No. 395,746, Aug. 18, 1989, Pat. No. 5,078,050.

[51] Int. Cl.[6] ........................ A21C 13/00; A21D 8/02; H05B 3/36

[52] U.S. Cl. ........................................ 99/483; 99/422; 99/432; 99/467; 99/DIG. 15; 126/281; 219/387; 219/521

[58] Field of Search .................. 99/339, 340, 422, 426, 99/432, 450, 483, DIG. 15, 476, 467; 206/545, 548, 549; 219/386, 387, 385, 521; 126/275 R, 281; 34/197, 196, 15

[56] References Cited

U.S. PATENT DOCUMENTS

D. 267,994 2/1983 Luzich .
D. 283,589 4/1986 Erlandson et al. .
D. 285,517 9/1986 Paulus .
D. 287,795 1/1987 Streepy .
D. 296,862 7/1988 Beltz .
D. 297,297 8/1988 Lacey .
D. 297,298 8/1988 Sarnoff et al. .
2,078,650 4/1937 Clark .
3,415,665 12/1968 Hussman .
3,718,485 2/1973 Lankford .............................. 99/403
3,721,803 3/1973 DiStefano .
3,747,513 7/1973 Seelbach .
3,887,716 6/1975 Seelbach .
3,987,719 10/1976 Kian .
3,994,115 11/1976 Mako et al. .
4,184,421 1/1980 Ahlgren .
4,190,965 3/1980 Erickson ............................... 34/197
4,236,063 11/1980 Glucksman ........................... 34/196
4,335,150 6/1982 Hosaka et al. .
4,367,243 1/1983 Brummett et al. .
4,367,243 1/1983 Brummett et al. .
4,378,729 4/1983 Pierick .
4,384,513 5/1983 Pierick .
4,400,404 8/1983 Persi .
4,494,654 1/1985 Gunther et al. .
4,494,786 1/1985 Paulus et al. .
4,500,276 2/1985 Cherasky et al. .
4,536,643 8/1985 Erickson ............................... 34/197
4,543,735 10/1985 Rizvi .
4,556,046 12/1985 Riffel et al. .
4,632,835 12/1986 Norris .................................. 99/483
4,632,836 12/1986 Abbott et al. .
4,643,167 2/1987 Brewer .
4,676,151 6/1987 Gorsuch et al. .
4,676,152 6/1987 Tsuji et al. ............................ 99/476
4,716,819 1/1988 Beltz .
4,745,249 5/1988 Daniels .
4,749,392 6/1988 Aoki et al. .
4,770,944 9/1988 Farrell et al. .
4,806,736 2/1989 Schirico .
4,816,646 3/1989 Solomon et al. .
4,863,601 9/1989 Wittekind et al. .................... 99/295
4,865,219 9/1989 Logan et al. .
4,904,492 2/1990 Prigge .
4,916,290 4/1990 Hawkins .
4,933,534 6/1990 Cunningham et al. .
4,955,125 9/1990 Steinman .
5,078,050 1/1992 Smith .

*Primary Examiner*—Timothy F. Simone
*Attorney, Agent, or Firm*—Crutsinger & Booth

[57] ABSTRACT

A method and apparatus for maintaining a food product at or above a desired serving temperature wherein a volume of dehumidifier material, such as calcium sulfate, is heated to a temperature greater than the predetermined serving temperature of the food product and positioned in heat exchange relation with the food product, such that heat is transferred from the heated dehumidifier material to the food product and moisture is transferred from the food product to the dehumidifier material.

21 Claims, 5 Drawing Sheets

CARRIER FOR HOT FOOD

CROSS REFERENCE TO RELATED APPLICATIONS

This application is a continuation-in-part of commonly owned U.S. patent application Ser. No. 07/395,746, filed Aug. 18, 1989, now U.S. Pat. No. 5,078,050, entitled "Hot Plate Carrier," the disclosure of which is incorporated herein by reference in its entirety for all purposes.

TECHNICAL FIELD

The carrier for hot food relates to improvements in insulated delivery bags for pizza and other cereal or dough products.

BACKGROUND OF INVENTION

Take-out food service is escalating and insulated delivery bags are often used for home delivery of hot food products. Flavor, texture, and overall quality of hot food products and particularly baked dough products deteriorate rapidly after the product is removed from the oven. Cooling of the product and absorption of moisture into the dough product are major factors which contribute to the deterioration of the flavor, texture, and overall quality of the dough product.

U.S. Pat. No. 4,632,836 discloses a pizza preparation and delivery system including a vehicle having a driver station and a kitchen area. Orders received by a mobile unit are prepared in the kitchen area of the vehicle while the vehicle is enroute to the delivery destination.

U.S. Pat. No. 4,806,736 discloses a heated delivery bag having an electric heating unit mounted inside a box adapted to be connected to an external power source, such as the cigarette lighter socket of a vehicle for maintaining pizza warm while it is being delivered. The temperature inside the portable container is maintained between 165° and 180° F. (74°-82° C.) by a thermostat which activates the heating element when the temperature falls below 165° F. (74° C.) and deactivates the heating element when the temperature climbs to about 180° F. (82° C.).

U.S. Pat. No. 4,816,646 discloses a food delivery bag with an electric hot plate for maintaining freshly baked pizza hot while being delivered.

While significant advances have been made in the area of take-out and home delivery food service, heretofore it has been difficult to maintain the "fresh baked" flavor, texture, and quality of dough products during the time required for delivery.

SUMMARY OF INVENTION

The invention disclosed herein relates to a method and apparatus for maintaining a food product at a predetermined serving temperature wherein a volume of dehumidifier material, such as calcium sulfate, is heated to a temperature greater than the predetermined serving temperature of the food product and positioned in heat exchange relation with the food product, such that heat is transferred from the heated dehumidifier material to the food product and moisture is transferred from the food product to the dehumidifier material. The disclosed embodiment includes a method and apparatus for preparing and delivering baked dough products, such a pizza, having a bottom crust and a moist topping.

An insulated portable carrier for hot food contains a dehumidifier system for removing vaporized moisture generated from baking and heating the pizza or other dough products. A hydrophobic cover is placed over the top of the dough product to reduce heat loss caused by the evaporation of moisture from the moist topping.

A portable carrier, particularly adapted for use in delivery of a hot baked dough product having a bottom crust and a moist topping, preferably includes an insulated carrier in which a vessel of dehumidifier material, such as a volume of granular calcium sulfate, is deposited to remove a sufficient amount of vapor moisture to prevent the dough product from losing its texture and quality for a predetermined time period. The volume of calcium sulfate is preferably heated before it is deposited in the container such that heat consumed to dry the calcium sulfate is used to maintain the temperature of the crust on the dough product greater than the temperature of the moist topping on the dough product.

The dough product is preferably partially baked and then placed in the portable carrier. The heated dehumidifier material in the vessel in the carrier provides heat to the bottom of the partially baked dough product to finish baking the crust and to maintain the temperature of the crust greater than the temperature of the moist topping to prevent condensation of moisture on the surface of the dough product.

A primary object of the invention is to provide a portable carrier for pizza and other baked dough products in which the "fresh baked" flavor of the product is optimized. Heated thermally conductive material is placed in heat exchange relation with the partially baked food product such that baking of the product continues while enroute to the consumer. A dehumidifier system removes steam generated from the dough product during the baking such that the dough product stays crisp.

DESCRIPTION OF DRAWINGS

Drawings of a preferred embodiment of the carrier for hot food are annexed hereto so that the invention may be better and more fully understood, in which.

Numeral references are employed to designate like parts throughout the various figures of the drawings.

DESCRIPTION OF A PREFERRED EMBODIMENT

Figure 1:
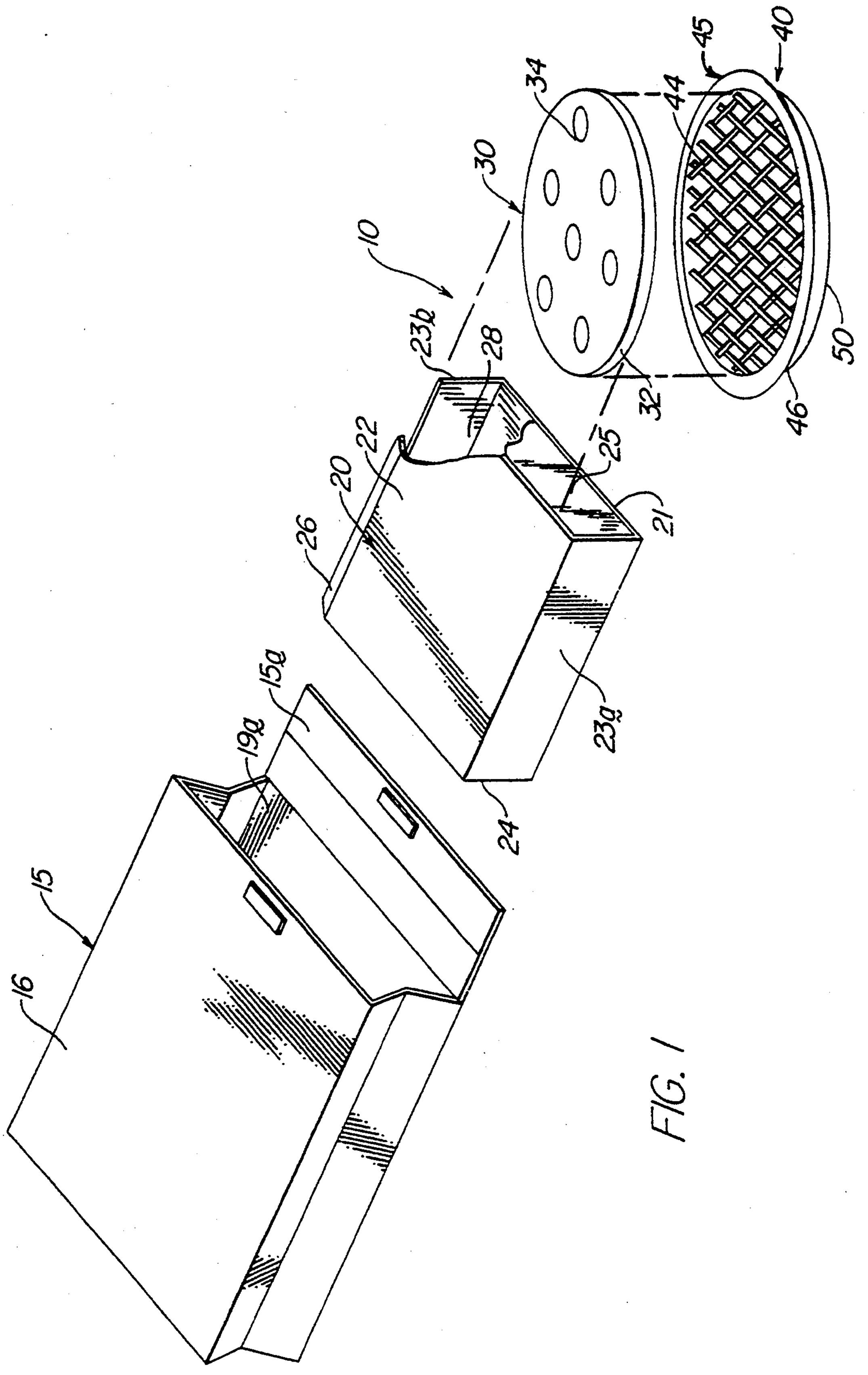
FIG. 1 is an exploded perspective view of an insulated carrier, a food product and a dehumidifier system.
Figure 2:
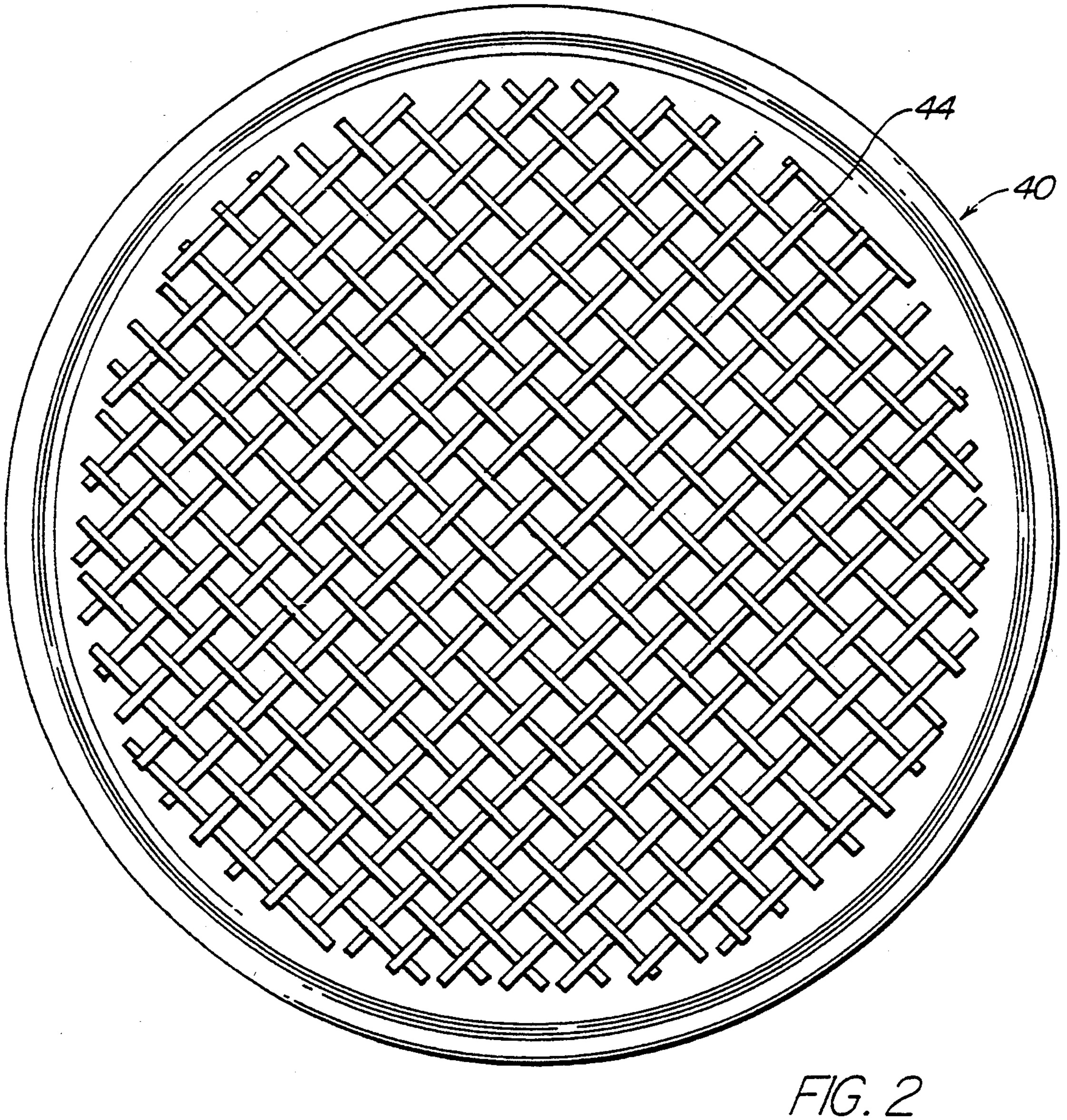
FIG. 2 is a top plan view of the dehumidifier system.
Figure 3:
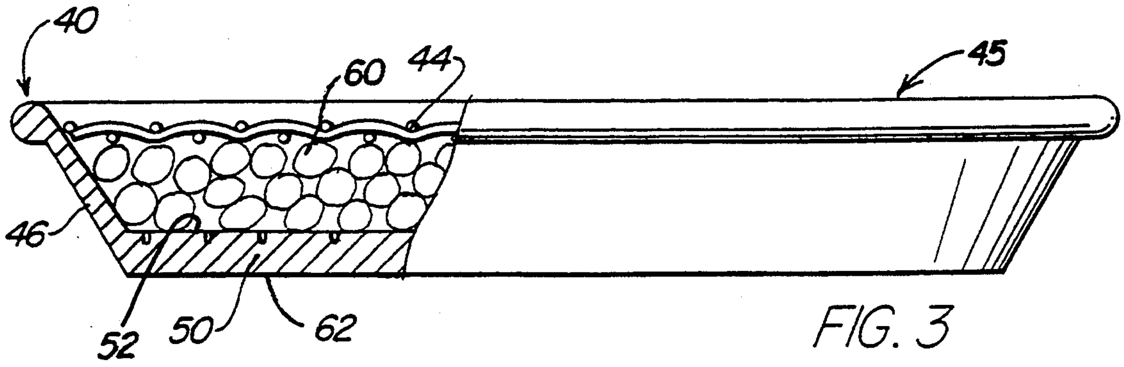
FIG. 3 is a side elevational view thereof, parts being broken away to illustrate granular dehumidifier agent.
Figure 4:
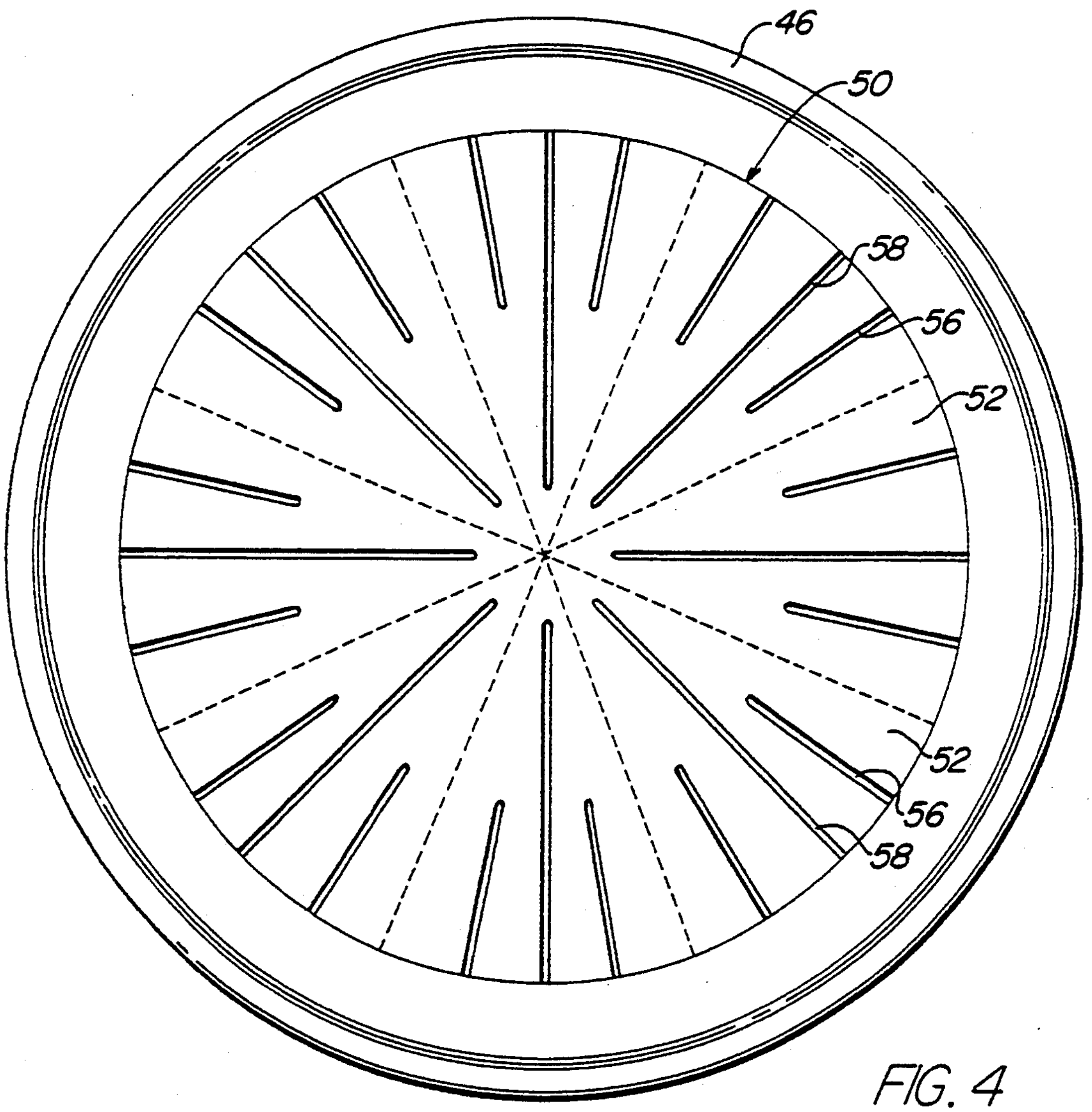
FIG. 4 is a top plan view of a vessel from which dehumidifier material has been removed.
Figure 5:
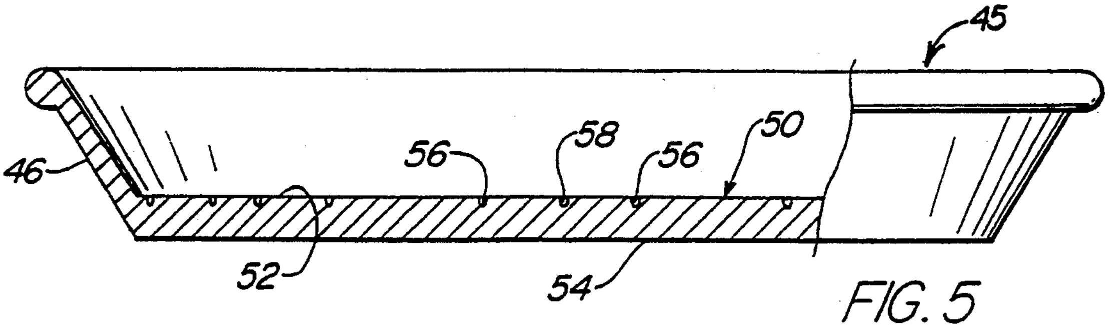
FIG. 5 is a side elevational view of the vessel, parts being broken away to more clearly show details of construction.
Figure 6:
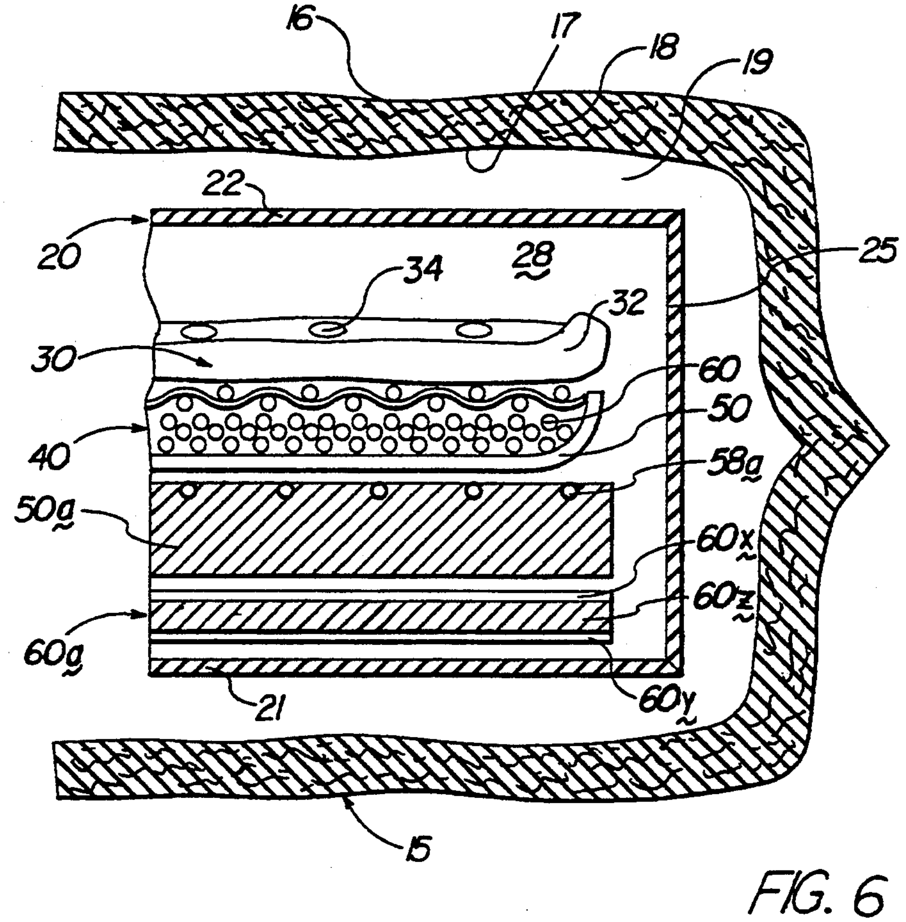
FIG. 6 is a cross-sectional view similar to FIG. 1 illustrating a carrier for hot food.

Referring to FIG. 1 of the drawing, the numeral 10 generally designates a carrier for a dough product 30 having a bottom crust 32 and a moist topping 34. Carrier 10 comprises a dehumidifier system 40 placed inside a food product box or other suitable container 20, which is in turn placed inside an insulated delivery bag 15.

The delivery bag 15 is of conventional design and is preferably formed of spaced sheets 16 and 17 of impervious material having insulating material 18 therebetween. Bag 15 has a closure flap 15*a* which can be moved to open and close an entrance passage 19*a* into an interior compartment 19 inside the bag.

Container 20 is of conventional design and is preferably formed of corrugated box board folded to form a bottom 21, top 22, sidewalls 23*a* and 23*b* and end walls 24 and 25. One or more flaps 26, preferably extending along edges of the top 22, are connectable to side wall 23*b* and end walls 24 and 25 to provide an interior chamber 28 inside carrier 20. When the box is placed near a heat source or a combination heat source and moisture absorbent, the bottom of the box should preferably be perforated to facilitate escape of moisture so that the moisture will not soften the crust.

The dehumidifier system 40 comprises a heat conductive vessel 45 with an over fitting heat conductive screen lid 44. Inside the vessel 45 is placed a granular dehumidifier agent 60 having a sufficient particle size to be held under the over fitting screen lid 44. As best illustrated in FIGS. 2–5 of the drawing, the dehumidifier system 40 comprises a vessel 45 having a sidewall 46 extending around the periphery of a heat conductive bottom plate 50. The upper surface 52 of the bottom 50 of vessel 45 has generally radially extending long grooves 58 formed therein extending from a position adjacent the center of surface 52 outwardly to the periphery of surface 52. In the illustrated embodiment, short grooves 56 and long grooves 58 are provided to permit the flow of air through the grooves in a direction generally radially relative to the upper surface 52 of heat conductive plate 50.

The dehumidifier agent 60 is particularly adapted to remove a sufficient amount of vapor moisture from the container 20 when contacted with the air therein to prevent the dough product 30 from losing its texture and quality. The dehumidifier agent 60 consists of chemical agents, that remove the vapor moisture by the process of forming a chemical hydrate, or adsorbent materials that remove the vapor moisture by the process of physical adsorption.

A preferred dehumidifier agent 60 comprises a chemical agent such as activated granular calcium sulfate (anhydrite) which is commercially available from W. A. Hammond Drierite Co. of Xenia, Ohio, under the registered trademark "Drierite." Calcium sulfate (anhydrite) undergoes the reversible formation of calcium sulfate hemihydrate when exposed to water:

(1) Dehumidify $$CaSO_4 \xrightarrow{+H_2O} CaSO_4 \cdot \tfrac{1}{2}H_2O$$

(2) Regenerate $$CaSO_4 \cdot \tfrac{1}{2}H_2O \xrightarrow[-H_2O]{heat} CaSO_4$$

The smallest diameter calcium sulfate granules that can be held in place by the over fitting lid 44 should be used because mass transfer resistance increases as the particle size increases. Therefore, the larger diameter granular adsorbent takes longer to remove moisture. Large pieces or a solid plate of the adsorbent would be the least effective. The granules may be held in place with a heat resistant adhesive because calcium sulfate is friable. Of course, most of the surface area of the calcium sulfate cannot be covered with the adhesive material, which would prevent the moisture vapor from contacting the calcium sulfate. If properly prepared, the pore volume within the granular calcium sulfate creates small capillaries which increases the water capacity by absorbing additional moisture by the process of physical adsorption. Calcium sulfate can be regenerated or reactivated by heating to about 390° F. (200° C.). However, if heated above 570° F. (300° C.), calcium sulfate losses some of its desiccating power. Calcium sulfate is an ideal chemical dehumidifier for use in the preparation of food products because it is non-toxic, chemically inert to most materials, inexpensive, and reusable. Furthermore, calcium sulfate has a very low solubility in water, which is important in case the material must be washed or is accidentally wetted. The minimum dew point for calcium sulfate at standard temperature and pressure is −67° C., which means that it is one of the best dehumidifying agents. However, like most dehumidifying agents, the effectiveness of calcium sulfate decreases with increasing temperature.

Alternatively, the dehumidifier agent 60 may comprise materials which remove moisture vapor by the process of physical adsorption, e.g., molecular sieve (zeolite), silica gel, and activated alumina.

Silica gel is difficult to work with because the diameter of the granular material is very small. The fine silica gel particles are not easy to contain with a screen that also allows moisture laden air to contact the dehumidifier agent.

Activated alumina is suitable as a dehumidifier agent 60 in the preparation and transportation of food products. The smallest diameter alumina granules that can be held in place by the over fitting lid 44 should be used because mass transfer resistance increases as the particle size increases. Therefore, the larger granular adsorbent takes longer to remove moisture. It is not necessary to bond these alumina granules in place with a heat resistant adhesive because the material is much less friable than calcium sulfate. Grade A alumina can be regenerated or reactivated by heating to about 300°–390° F. (150°–200° C.), but it can withstand temperatures up to about 570° F. (300° C.). Activated alumina is an ideal dehumidifier agent 60 for use in the preparation of food products because it is non-toxic, chemically inert to most materials, inexpensive, and reusable. Furthermore, alumina is highly insoluble in water, which is important in case the material must be washed or is accidentally wetted. Alumina is much less soluble in water than calcium sulfate. The minimum dew point for alumina is −89° F. (−67° C.), the same as the minimum dew point for calcium sulfate. However, like most dehumidifying agents, the effectiveness of alumina decreases with increasing temperature. The specific heat of alumina is 0.240, which compares favorably with aluminum, for which the specific heat is 0.215. Heated alumina could also provide an excellent source of heat for baking the food product.

Figure 8:
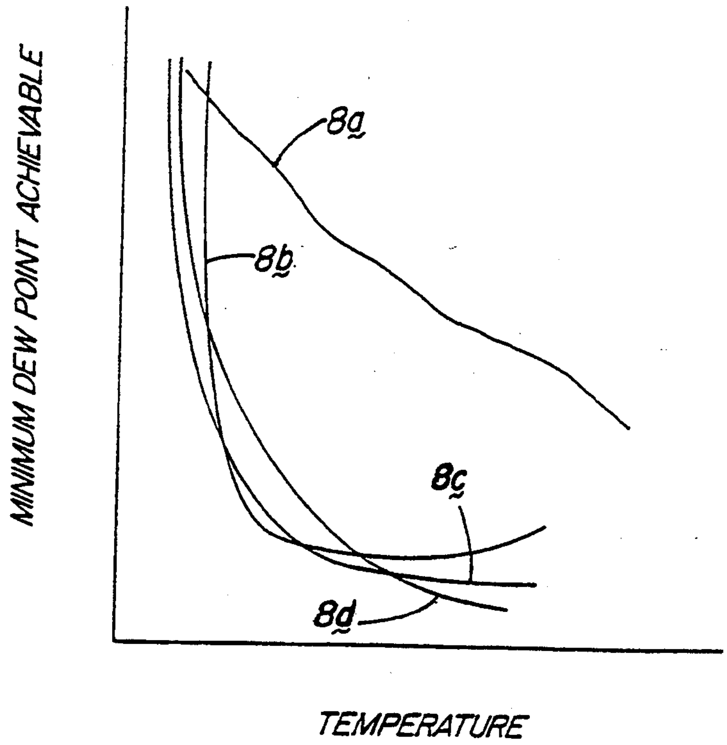
FIG. 8 is a graphic representation comparing the minimum dew points achievable with various dehumidifier agents at elevated temperatures.

Molecular sieve (zeolite) in particular is suitable as dehumidifier agent 60 in the preparation and transportation of food products. There are many types of molecular sieve, one of the more common molecular sieve is designated "Type 4A." The smallest diameter molecular sieve granules that can be held in place by the over fitting lid 44 should be used because mass transfer resistance increases as the particle size increases. Therefore, the larger granular adsorbent takes longer to remove moisture. It is not necessary to bond these molecular sieve granules in place with a heat resistant adhesive because the material is much less friable than calcium sulfate. Type 4A molecular sieve can be regenerated or reactivated by heating to about 390° F. (200° C.), but it can withstand temperatures as high as 1300° F. (700° C.). Molecular sieve is an ideal dehumidifier agent for use in the preparation of food products because it is non-toxic chemically inert to most materials, inexpensive, and reusable. Molecular sieve is physically stable when wetted with water, which is important in case the material must be washed or is accidentally wetted. Furthermore, molecular sieve has the additional property of selectively adsorbing small molecules such as water while excluding larger molecules, such as those responsible for the pleasant aroma of fresh baked dough product, resulting in maximum efficiency and appeal to the customer. This special characteristic of discriminating against larger size molecules also helps prevent fouling of the adsorptive surface by high molecular weight compounds. Referring to FIG. 8, molecular sieves have exceptional dehumidifying properties at elevated temperatures. Curve 8*a* represents molecular sieves and curves 8*b*, 8*c*, and 8*d* represent calcium sulfate, silica gel, and alumina. The minimum dew point at standard temperature and pressure is less than −148° F. (−100° C.), but a dew point of −100° F. (−75° C.) can be obtained at 194° F. (90° C.) with a molecular sieve having water adsorbed to the level of 1 wt %. The specific heat of molecular sieve Type 4A is 0.250, which compares favorably with aluminum, for which the specific heat is 0.215. The molecular sieve could provide an excellent source of heat for baking the food product.

Any one of these dehumidifying agents 60 is preferably contained in an appropriately designed dehumidifier system 40 that has a suitably adapted screen covering 44 to allow the moist air in the food product container 20 to contact with the dehumidifying agent 60. The dehumidifier agent 60 may be positioned in vessel such that it contacts the heat conductive bottom plate 50, or it could be advantageously situated above or beside the food product inside the food product box 20.

If the dehumidifier system 40 and hot plate 50 are heated to a temperature of, for example, greater than 250° F. and a partially baked dough product 30 is positioned thereon, heat transferred to the crust of the dough product 30 from the heated dehumidifier system 40 and heat conductive plate 50 will continue baking the dough product. Moisture liberated from dough product 30 during baking is removed from the air in food product box 20 when it contacts the dehumidifier agent 60 contained in the dehumidifier system 40.

In some instances it may be advantageous to place the dough product 30 directly onto the dehumidifier system 40. Many dehumidifier agents 46 are not as efficient at elevated temperatures so the dehumidifier system 40 would work more efficiently if it were cooled before placing it into the food product box 20 with a dough product 30. If the dehumidifier system 40 is allowed to cool before use, it should be cooled in an airtight container so that moisture from the ambient air does not reduce the activity of the dehumidifier agent 60 prior to use. In this configuration the dough product would be placed directly onto the heat conductive plate 50, which would exclusively provide the heat for finish baking and keeping the dough product hot. The dehumidifier system 40 could be situated anywhere in the food product box 20 other than between the heat conductive plate 50 and the food product 30.

Dough product 30 is preferably partially baked when it is deposited in box 20 and positioned in heat transfer relation with heated dehumidifier system 40 and heat conductive plate 50. Heat transferred to the dough product 30 finishes baking the dough product and maintains the temperature of the product at an ideal serving temperature.

Figure 7:
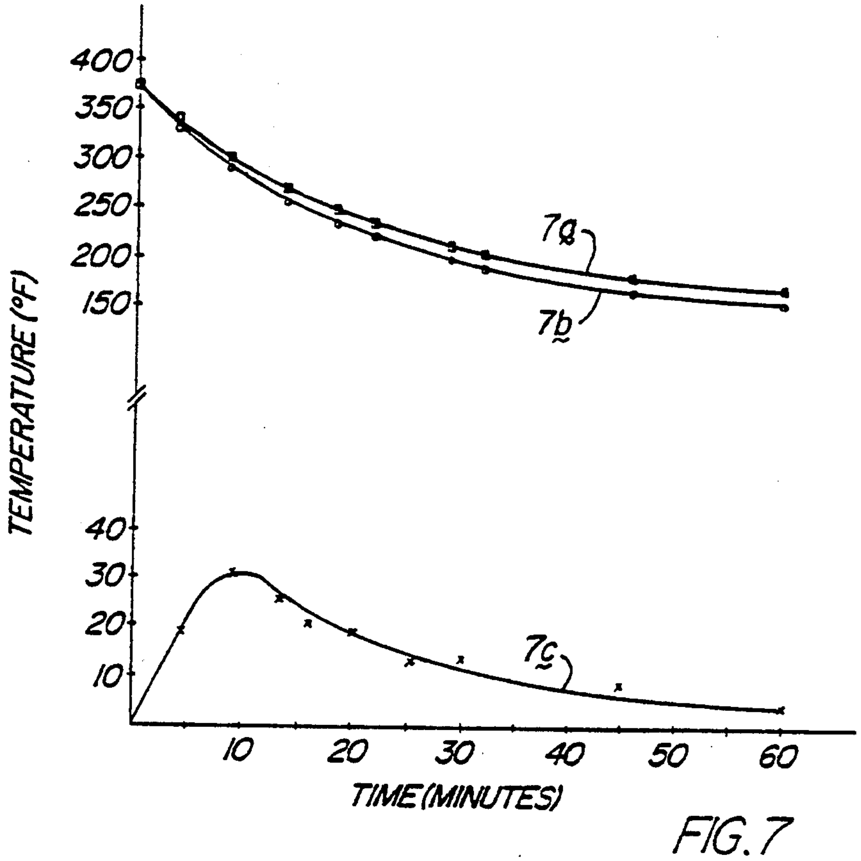
FIG. 7 is a graphic representation of empirical data of temperature vs. time for a dehumidifier system comprising an aluminum tray containing a granular dehumidifier agent covered by an over fitting screen.

Referring to FIG. 7 of the drawing, the upper curve 7*a* illustrates empirical data regarding the cooling rate of a dehumidifier system 40 and an aluminum heat conductive plate 50, wherein the total weight of aluminum is 15 pounds (6.8 Kg) and the calcium sulfate granules weighs 2 pounds (0.9 Kg), heated to an initial temperature of 375° F. (190° C.). Curve 7*a* illustrates the temperature vs. time of the dehumidifier system 40 and heat conductive plate 50 without a pizza mounted thereon over a one hour period. Curve 7*b* illustrates the temperature of an identical dehumidifier system 40 and heat conductive plate 50 having a pizza supported on the surface thereof over a one hour period. Curve 7*c* illustrates the temperature difference between the temperature v. time curves 7*a* and 7*b*. Heat is initially transferred from dehumidifier system 40 and heat conductive plate 50 to the bottom crust 32 of food product 30 at a rapid rate for about ten minutes to finish baking the product or to preserve the temperature of the product.

During the baking process the bottom crust 32 is formed as the crust dries and moisture migrates to the surface. Drying action of the crust continues as the food product cools to a serving temperature of about 160° F. (70° C.) provided that the moisture in the box 20 is vented or removed by the dehumidifier system 40 after it migrates from the surface of the dough.

In a closed container, the temperature required to finish baking the product and/or to preserve the temperature of the product is substantially higher than that in a vented container. In a closed container the moisture content of the air is much higher than in a vented container, and so more heat is required to keep the air heated above the dew point of the humid air. Otherwise the water vapor may be absorbed by the dough product and cause softening and cooling of the product.

However, venting the container does not solve the problem of supplying extra heat energy to keep the air temperature above the dew point of the humid air. Furthermore, venting the container causes other problems. For example, the vented moist air carries away a great deal of wasted heat energy consumed in vaporizing the water in the dough product during the baking process. Some of this energy can be recaptured and kept in the insulated carrier by transferring the moisture vapor with its heat energy and heat of evaporation energy to the dehumidifier system 40. The heat transferred to the dehumidifier system 40 may help to continue finish baking the product and/or preserve the temperature of the product.

Basically, the baking process involves certain temperature end points. In products such as bread, buns or pizza crust, the crisp outer crust is in constant moisture exchange with the moist interior. In pizzas the crisp bottom crust is formed and maintained by an entirely different heating profile than the moist cheese, tomato paste, vegetable and meat toppings. The moist leavened dough gels from pasty consistency to irreversible gel form in the range of 160° to 175° F. (70°-80° C.). High gluten dough can become undesirably tough at temperatures over 200° F. (90° C.) in the thin layer under the crust or if heated for too long.

The texture, color, taste and odor of the crusts of such dough products comes from heat reactions of drying and caramelization. Forming a crisp brown crust usually requires the outer layers of a product to reach over 300° F. (150° C.). These reactions are much slower at lower temperatures. Of course, crispness or dry plasticizing occurs only as the product is well above 212° F. (100° C.).

To form the usually desirable crust on the outside of moist dough products the outside must first dry sufficiently deeply so that the water wicking to the surface does not absorb the oven heat in evaporation. The faster the heat is applied to the surface the thinner the crust can be. The accelerated heat transfer rate at relatively low temperature as applied in forced convection baking and especially in air jet impingement, described in Smith U.S. Pat. No. 4,154,861, the disclosure of which is incorporated herein by reference, permits formation of thin crisp crusts.

In baking cereal dough products for the table ready market such as retail bakeries or restaurants providing home delivery, maintaining the "fresh baked" texture, odor, taste and appearance is very important. However, the moist center continually supplies moisture to the surface of the crust which cools the product as the water evaporates and the moisture softens the crisp crust. The "bite" in French bread or in a pizza crust demands dry crispness. The flavors and volatile odors from the crust are fugitive and need to be continually generated for full appreciation.

Heretofore, to enclose the product 30 in a container caused the water vapor to be contained and to be absorbed by the dry crust. This made the crust soft. If the baking heat is withdrawn the generation of volatile odor and flavor components is greatly reduced.

To bake and supply freshly baked dough products with moist centers or moist surface portions while providing a crisp crust with fresh texture, odor, and taste, the crust must be continually heated to disperse the water which wicks from the interior of the product. The air temperature surrounding the dough product must be maintained above the dew point of the air to prevent condensation from softening and toughening the crust. Reducing the amount of moisture in the surrounding air concomitantly reduces the dew point of the air. Incorporating the dehumidifier system 40 into the food product box 20 accomplishes the goal of reducing the moisture content of the air in the box.

To accommodate the widely varying times from the oven to the consumer in table ready meal service, the product should be baked as close to serving as possible and then maintained with controlled continual heat input to the crust.

For table ready service most hot foods should be served at 140° to 170° F. (60°-75° C.). At this temperature range the water in a moist product migrates rapidly and the water vapor pressure is quite high so crust softening is rapid.

For breads with overall crust heating with hot air temperature over 170° F. (75° C.) is widely used. This air must be heated ambient air or dehumidified recirculated air, not moist recirculated air. Such low temperature does not replace the odor and taste of higher baking temperatures but can generally maintain crust texture. For comparison, one might compare the soft crust of usual packaged bread and buns with the freshly baked mini-loaf in a fine restaurant.

For baking and table-ready service of products like pizza which has a crisp crust and exposed moist toppings special devices and methods are required to maintain product quality.

Together, the dehumidifier system 40 and heated conductive plate 50 maintain crispness in a pizza crust 32 by continually applying heat to the crust while removing most of the water vapor from atmosphere in the food product box 20. However, since the crust will continue to bake and will become thick and hard if maintained too hot, the primary baking should be continued at a slow pace as long as possible and then the heat on the crust should be reduced. If the heat is gradually reduced, the fresh flavor and odor will continue to be generated and to give only slightly less than "fresh baked" appreciation.

The method of prebaking the toppings and at least partially baking the crust, then continuing the baking of the crust while gradually reducing temperature when the product is enroute to the consumer provides flexibility in the time between removing the product from the oven and the time the product reaches the consumer. This provides a result similar to that attained by shutting down the heat in an oven after the top of the product is baked and then letting the heat in the deck of the oven finish baking the crust while continuing to cool slowly to keep the pizza condition as good as possible. The final baking temperature and the rate of oven cooling will be different for thin crisp pizzas, thick Chicago style pizza or pan pizzas and other types of dough products.

The most practical means of accomplishing this finish baking and hot holding during delivery is use of a dehumidifier system 40 and a hot plate 50 of sufficient combined heat capacity. The dehumidifier system reduces the moisture content of the air and helps preserve the crisp texture of the crust. An insulated delivery bag 15 provides additional thermal insulation to retard further cooling of the dough product 30 for the holding phase of the delivery time.

Usually the pizzas 30 are taken from the oven and placed on a cutting board or in a cold pan for cutting. This cools the crust causing early sogginess. Instead, the pizza should be cut on the hot delivery plate 50. Even cutting in the baking pan when the pan is on a cold metal surface can be detrimental. If the pizza 30 is baked on a plate or in a pan, this hot plate or pan is placed onto the heat conductive plate 50 and the pizza 30 is cut on the plate or in the pan using a chopper shaped knife.

If the heated delivery plate 50 incorporates the dehumidifier agent 60, the dehumidifier agent can be regenerated or reactivated by heating in the same oven used to partially bake the crust.

From the foregoing it should be apparent that the method of baking a leavened cereal product 30 includes the steps of placing it in close proximity to a heated dehumidifier system 40 and hot plate 50 of sufficient combined heat capacity to continue some baking and keep the food product hot. As the dehumidifier system 40 and hot plate 50 cool, heat is transferred to the dough product to extend the fresh baked qualities of the product.

What is claimed is:

1. A portable carrier for a baked dough product having a bottom crust and a moist topping comprising:
   (a) a container for the dough product;
   (b) a perforated support to support the dough product;
   (c) a heater adjacent the support, said heater being adapted to maintain the temperature of the crust of the dough product at a desired serving temperature; and
   (d) a sufficient quantity of moisture absorbent material in the container to absorb a sufficient amount of vapor moisture to substantially retard the dough product from losing its freshly baked texture and quality.

2. A portable carrier for a baked dough product having a bottom crust and a moist topping comprising:
   (a) a container for the dough product;
   (b) a perforated support means to support the dough product;
   (c) a heat conductive plate adjacent the support means, said heat conductive plate being adapted to maintain the temperature of the crust of the dough product at a desired serving temperature; and
   (d) a dehumidifier means in the container, the dehumidifier means being adapted to absorb a sufficient amount of vapor moisture to substantially retard the dough product from losing its freshly baked texture and quality.

3. The carrier of claim 2 wherein the heat conductive plate has a sufficient heat capacity and is heated to a sufficient initial temperature sufficient to complete baking and to maintain the temperature of the crust above 150° F. (65° C.) for at least 15 minutes, 4. The carrier of claim 2 wherein the heat conductive plate has a sufficient heat capacity and is heated to a sufficient initial temperature to complete baking and to maintain the temperature of the crust above 150° F. (65° C.) for at least 45 minutes, 5. The carrier of claim 2 wherein the heat conductive plate has a sufficient heat capacity and is heated to a sufficient initial temperature to complete baking and to maintain the temperature of the crust above 212° F. (100° C.) for at least 10 minutes to complete baking the dough product after the partially baked dough product is taken from the oven and placed in the portable carrier.

6. The carrier of claim 2 wherein the heat conductive plate has a sufficient heat capacity and is heated to a temperature between about 200–400° F. (90°–200° C.) to complete baking and to maintain the temperature of the crust above 212° F. (100° C.) for at least 10 minutes to complete baking the dough product after the partially baked dough product is taken from the oven and placed in the portable carrier, 7. A portable carrier for a baked dough product having a bottom crust and a moist topping comprising:
   (a) a container for the dough product;
   (b) a perforated support means to support the dough product;
   (c) a heater means adjacent the support means, said heater means being adapted to maintain the temperature of the crust of the dough product at a desired serving temperature; and
   (d) a dehumidifier means in the container, the dehumidifier means being adapted to absorb a sufficient amount of vapor moisture to substantially retard the dough product from losing its freshly baked texture and quality, wherein the dehumidifier means is selected from the group consisting of chemical agents that remove moisture vapor by the chemical formation of a hydrate and moisture adsorbent materials that remove moisture vapor by the process of physical adsorption.

8. The carrier of claim 7 wherein the dehumidifier means comprises granular material.

9. The carrier of claim 8, wherein the granular dehumidifier material has a sufficiently large diameter to be retained in a vessel with holes in the walls so that moist air can freely pass through the walls of the receptacle.

10. The carrier of claim 7 wherein the dehumidifier is regenerated by heating to a temperature of between about 300°–575° F. (150°–300° C.) for between about 15 minutes to 4 hours.

11. The carrier of claim 7 wherein the chemical agents that remove moisture by the process of chemically forming a hydrate are selected from the group consisting essentially of calcium sulfate, calcium anhydrite and calcium hemihydrate.

12. The carrier of claim 11 wherein the chemical agents that remove moisture by the process of chemically forming a hydrate are regenerated by heating to a temperature between about 300°–575° F. (150°–300° C.).

13. The carrier of claim 11 wherein the chemical agents that remove moisture by the process of chemically forming a hydrate are regenerated by heating to a preferred temperature of a about 390° F. (200° C.).

14. The carrier of claim 7 wherein the moisture adsorbent materials that remove moisture by the process of physical adsorption are selected from the group consisting essentially of molecular sieve (zeolite), silica, silica gel, and activated alumina.

15. The carrier of 14 wherein the moisture adsorbent material that removes moisture by the process of physical adsorption is Type 4A molecular sieve.

16. The carrier of claim 15 wherein the Type 4A molecular sieve is reactivated by heating to a temperature between about 300°–1290° F. (150°–700° C.).

17. The carrier of claim 15 wherein the Type 4A molecular sieve is reactivated by heating to a preferred temperature between about 390°–570° F. (200°–300° C.).

18. The carrier of claim 15 wherein the Type 4A molecular sieve is reactivated by heating to a preferred temperature of about 390° F. (200° C.).

19. A portable carrier for a baked dough product having a bottom crust and a moist topping comprising:
   (a) a container for the dough product;
   (b) a perforated support means to support the dough product;
   (c) a heater means adjacent the support means, said heater means being adapted to maintain the temperature of the crust of the dough product at a desired serving temperature;
   (d) a dehumidifier means in the container, the dehumidifier means being adapted to absorb a sufficient amount of vapor moisture to substantially retard the dough product from losing its freshly baked texture and quality; and
   (e) a hydrophobic cover over the moist topping to reduce evaporative cooling and to retard the transfer of moisture from the moist topping to the inside of the container and the dough crust.

20. The carrier of claim 19 wherein the hydrophobic cover is insulated to retard heat loss from the moist topping and condensation of moisture onto the moist topping.

21. The carrier of claim 19 wherein the hydrophobic cover is placed over the moist topping with a small space between the moist topping and the hydrophobic cover to prevent the hydrophobic cover from sticking to the moist topping.

* * * * *

UNITED STATES PATENT AND TRADEMARK OFFICE

CERTIFICATE OF CORRECTION

PATENT NO. : 5,404,808

DATED : April 11, 1995

INVENTOR(S) :

Donald P. Smith, Jarald E. High & John R. Norris

It is certified that error appears in the above-indentified patent and that said Letters Patent is hereby corrected as shown below:

Column 9, line 34, change the comma at the end of the claim to a period.

Column 9, line 39, change the comma at the end of the claim to a period.

Column 9, line 55, change the comma at the end of the claim to a period.

Signed and Sealed this

Thirteenth Day of June, 1995

Attest:

BRUCE LEHMAN

*Attesting Officer* *Commissioner of Patents and Trademarks*